(12) United States Patent
Bello et al.

(10) Patent No.: US 10,812,397 B2
(45) Date of Patent: Oct. 20, 2020

(54) METHOD FOR MANAGING TRAFFIC IN A NETWORK BASED UPON ETHERNET SWITCHES, VEHICLE, COMMUNICATION INTERFACE, AND CORRESPONDING COMPUTER PROGRAM PRODUCT

(71) Applicants: Marelli Europe S.p.A., Corbetta (IT); Università degli Studi di Catania, Catania (IT)

(72) Inventors: Lucia Lo Bello, Catania (IT); Gaetano Patti, Catania (IT); Filippo Battaglia, Messina (IT); Marco Arena, Corbetta (IT); Giancarlo Vasta, Corbetta (IT)

(73) Assignees: Marelli Europe S.p.A., Corbetta (IT); Università degli Studi di Catania, Catania (IT)

( * ) Notice: Subject to any disclaimer, the term of this patent is extended or adjusted under 35 U.S.C. 154(b) by 0 days.

(21) Appl. No.: 16/222,677

(22) Filed: Dec. 17, 2018

(65) Prior Publication Data
US 2019/0199641 A1    Jun. 27, 2019

(30) Foreign Application Priority Data
Dec. 22, 2017   (IT) .......................... 102017000149137

(51) Int. Cl.
*H04L 12/851*    (2013.01)
*H04L 12/865*    (2013.01)
(Continued)

(52) U.S. Cl.
CPC .......... *H04L 47/2441* (2013.01); *H04L 47/22* (2013.01); *H04L 47/2416* (2013.01);
(Continued)

(58) Field of Classification Search
CPC ......... H04L 47/31; H04L 47/56; H04L 47/58; H04L 49/351; H04L 49/9047;
(Continued)

(56) References Cited

U.S. PATENT DOCUMENTS

2018/0048575 A1*  2/2018  Mangin .................. H04L 47/32
2019/0007344 A1*  1/2019  Mangin .................. H04L 47/31

OTHER PUBLICATIONS

Search Report for Italian Patent Application No. 201700149137 dated Aug. 1, 2018.
(Continued)

*Primary Examiner* — Kan Yuen
(74) *Attorney, Agent, or Firm* — Howard & Howard Attorneys PLLC (57) ABSTRACT

A method for managing traffic in a network based upon Ethernet switches, which are compliant with the IEEE 802.1Q and TSN communication standards, including the steps of dividing frames received into queues; scheduling transmission of the frames contained in the queues on the basis of the respective priorities of the traffic classes; and, if frames are present belonging to a traffic class in the plurality of traffic classes that has a higher priority than frames belonging to the event-triggered traffic class and when at least one protected time window occurs, transmitting the frames that belong to the traffic class with higher priority and blocking transmission of the frames that belong to the remaining traffic classes; and if the queue dedicated to the event-triggered traffic class is empty, transmitting a frame belonging to one of the remaining traffic classes that have frames with a priority lower than the frames belonging to the event-triggered traffic class.

10 Claims, 4 Drawing Sheets

(51) Int. Cl.
 *H04L 12/853* (2013.01)
 *H04L 12/805* (2013.01)
 *H04L 12/815* (2013.01)
 *H04L 12/863* (2013.01)

(52) U.S. Cl.
 CPC ............ *H04L 47/36* (2013.01); *H04L 47/628* (2013.01); *H04L 47/6215* (2013.01); *H04L 47/6275* (2013.01); *H04L 47/245* (2013.01)

(58) Field of Classification Search
 CPC ..... H04L 41/5022; H04L 47/22; H04L 47/24; H04L 47/2416; H04L 47/2433; H04L 47/2441; H04L 47/245; H04L 47/28; H04L 47/36; H04L 47/6215; H04L 47/6275; H04L 47/628
 See application file for complete search history.

(56) References Cited

OTHER PUBLICATIONS

Ashjaei, Mohammad et al., "Schedulability analysis of Ethernet Audio Video Bridging networks with scheduled traffic support," Real-Time Systems, vol. 53, No. 4, pp. 526-577 (Feb. 2, 2017).

Götz, Franz-Josef, "Alternative Shaper for Scheduled Traffic in Time Sensitive Networks", Presentation at IEEE 802.1 TSN TG Meeting—Vancouver, Jan. 15, 2013 (available at http://www.ieee802.org/1/files/public/docs2013/new-goetz-TSN-4-Industrial-Networks-20130115-v1.pdf).

IEEE Std 802.1Qbv-2015, "IEEE Standard for Local and metropolitan area networks—Bridges and Bridged Networks—Amendment 25: Enhancements for Scheduled Traffic," Amendment to IEEE Std 802.1Q-2014, pp. 1-57 (Mar. 18, 2016).

IEEE Std 802.1Qbu-2016, "IEEE Standard for Local and metropolitan area networks—Bridges and Bridged Networks—Amendment 26: Frame Preemption," Amendment to IEEE Std 802.1Q-2014, pp. 1-52 (Aug. 30, 2016).

Meyer, Philipp, et al., "Extending IEEE 802.1 AVB with Time-triggered Scheduling: A Simulation Study of the Coexistence of Synchronous and Asynchronous Traffic," 2013 IEEE Vehicular Networking Conference, IEEE, pp. 47-54 (Dec. 16, 2013).

Steinbach, Till, et al., "Beware of the Hidden! How Cross-traffic Affects Quality Assurances of Competing Real-time Ethernet Standards for In-Car Communication," 2015 IEEE 40th Conference on Local Computer Networks (LCN), IEEE, pp. 1-9 (Oct. 26, 2015).

Thangamuthu, Sivakumar, et al., "Analysis of Ethernet-Switch Traffic Shapers for In-Vehicle Networking Applications," Proceedings of the 2015 Design, Automation & Test in Europe Conference & Exhibition, pp. 55-60 (Grenoble, France, Mar. 9-13, 2015).

Thiele, Daniel, et al., "Formal Worst-Case Timing Analysis of Ethernet TSN's Burst-Limiting Shaper", Proceedings of the 2016 Design, Automation and Test in Europe Conference & Exhibition, pp. 187-192 (Dresden, Germany, Mar. 14-18, 2016).

Time Sensitive Networking Task Group of IEEE 802.1, "IEEE P802.1Qbv/D3.1 Draft Standard for Local and Metropolitan Area Networks—Bridges and Bridged Networks—Amendment: Enhancements for Scheduled Traffic," pp. 1-52 (Sep. 22, 2015).

\* cited by examiner

METHOD FOR MANAGING TRAFFIC IN A NETWORK BASED UPON ETHERNET SWITCHES, VEHICLE, COMMUNICATION INTERFACE, AND CORRESPONDING COMPUTER PROGRAM PRODUCT

CROSS-REFERENCE TO RELATED APPLICATIONS

The present application claims priority to and all the benefits of Italian Patent Application No. 102017000149137, filed on Dec. 22, 2017, which is hereby expressly incorporated herein by reference in its entirety.

BACKGROUND OF THE INVENTION

1. Field of the Invention

The present disclosure relates to traffic management in communications based upon Ethernet switches that are, in particular, compliant with the IEEE 802.1Q communication standards defined by the Time Sensitive Networking (TSN) Working Group of IEEE; see, for example, the website: www.ieee802.org/1/pages/tsn.html.

One or more embodiments regard application of Ethernet communication in the automotive, industrial, aerospace, and/or avionics fields.

2. Description of the Related Art

The last few years have witnessed an increase in the data that electronic control units (ECUs) must be able to manage and process. An example is represented by the data coming from the numerous sensors/devices present on board a motor vehicle (cameras, radars, sonars, GPSs, LIDARs, etc.), an aircraft (flight recorder, entertainment, etc.), or an industrial complex (industrial PCs, machinery/robots, etc.).

An increase in data automatically leads to an increase of bandwidth required for transmission of data, which commonly is of the order of 100 Mbps and in a near future is bound to grow. Moreover, a massive presence of sensors/devices may involve the use of a larger amount of cables and connectors, which has repercussions in terms of weight and costs.

Consequently, also in the automotive field, to solve this type of problems there has been introduced the use of Ethernet as physical communication mechanism.

In particular, in automotive control applications and, more in general, in industrial applications with stringent requirements of a temporal nature, a desired requisite is to guarantee a high level of safety. Consequently, it is desirable for real-time transmission of the data to be of a deterministic type.

A deterministic transmission of data consequently means that it is desirable to know, instant by instant, what and how many data are expected.

To facilitate guarantee of the above condition, all the nodes of the network must be synchronised.

Consequently, Time-Sensitive Networking (TSN) has been created, which consists of a set of standards defined by the Time-Sensitive Networking (TSN) Working Group of IEEE, which improve the real-time characteristics of the switches based upon the IEEE 802.1Q standard and solve problems of synchronisation and determinism of the communication, guaranteeing a high level of reliability.

TSN introduces three fundamental components:

time synchronisation: the nodes that participate in real-time communication have a common reference time; in this way, it is possible for all the devices connected to a network to operate simultaneously and carry out a given operation at a given moment;

scheduling: coexistence is enabled of different traffic classes with different priorities on one the same network; the standards enable definition of classes having different requisites in terms of bandwidth and end-to-end latency; some classes, namely, the priority ones, will have an upper-bounded latency guaranteed; and selection of the communication paths, path reservation, and fault tolerance: all the nodes that participate in real-time communication use the same rules for selection of the communication paths, possibly using more than one simultaneous path for guaranteeing both error tolerance and fault tolerance.

The flows are assigned to the traffic classes during design of the system on the basis of the requisites of each individual application.

Moreover, the IEEE 802.1Qav standard, subsequently included in the 2014 802.1Q standard, introduces traffic shaping, which enables management of the priorities of the various frames at output from the queues. Traffic shaping makes it possible to determine, for example on the basis of a priority and a maximum latency assigned to each queue, when a frame of a given queue can be transmitted.

Figure 1:
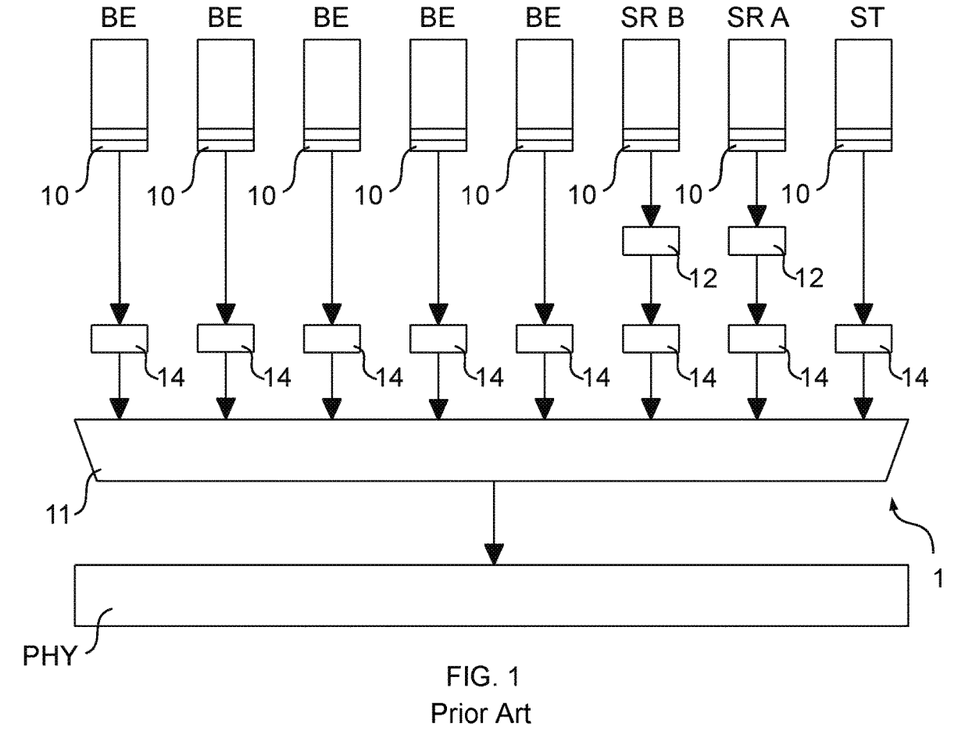
FIG. 1, described previously, is a block diagram provided by way of example of a communication interface for a network constituted by Ethernet switches that comply with the IEEE 802.1Q and IEEE 802.1Qbv standards or by proprietary switches inspired thereby.

The improvements to scheduling that enable the switches to sustain traffic of a time-driven type are introduced in the IEEE 802.1Qbv standard, the communication interface 1 of which, understood as system of queues, ports, and associated mechanisms, is illustrated in FIG. 1. The IEEE 802.1Qbv standard envisages management of the following traffic classes, presented in decreasing order of priority:

scheduled traffic (designated in FIG. 1 by ST): real-time traffic having the highest priority, generated and transmitted according to a predefined temporal programming, so as not to suffer from interference due to other traffic classes;

stream-reservation traffic (designated in FIG. 1 by SR): real-time periodic traffic typically subject to traffic shaping and divided into two classes, class A and class B, with decreasing priority, having a reserved band and guaranteed and limited end-to-end latency (the standard specifies the values of maximum latency for the two classes on seven hops, i.e., seven intermediate devices through which the data must pass between the source and the destination);

best-effort traffic (designated in FIG. 1 by BE): non-real-time traffic, having a priority lower than that of the other classes, which is served without any guarantee either of delivery or of maximum latency.

The IEEE 802.1Q-2014 standard, "IEEE Standard for Local and Metropolitan Area Networks—Bridges and Bridged Networks", November 2014, envisages that for each Ethernet communication port, whether it is a bridge/switch or an end-node, a number N of transmission queues are present, designated by the reference number 10, managed in a First-In First-Out (FIFO) mode, where the number N of queues is generally comprised between 2 and 8 (for example, in FIG. 1 eight queues are represented).

Corresponding to each queue 10 is a priority and, as a function of a strict-priority (SP) scheduling policy and via a block 11, first the queue 10 with highest priority that is not empty is served (in FIG. 1 the queue 10 with highest priority is the one illustrated on the right, and the priority decreases from right to left), and the frame that is located at the head of the queue 10 is transmitted.

Moreover, the IEEE 802.1Q-2014 standard envisages the possibility of associating to some of the queues 10 present on each port at output from the switches and end nodes a traffic shaper 12 referred to as "credit-based shaper CBS", which serves to limit the traffic bursts at output from the queues, i.e., to prevent data-traffic jams due to high volumes of high-priority traffic that would monopolise the communication channel.

The shaper CBS 12 can be connected at output to the queues 10 belonging to the traffic classes SR, A and B, and in general to the real-time periodic-traffic classes. Each of the classes of an SR type (for example, SR A and SR B in the embodiment exemplified) can have a variable credit value, which can vary within a range comprised between an upper value hiCredit and a lower value lowCredit. If the credit for a class is lower than zero, the frames of that class are not transmitted, whereas, if the credit for a class is higher than or equal to zero, the frames of that class can potentially be transmitted, if they are frames belonging to traffic classes, for example, ET and ST, with higher priority. During transmission of frames belonging to a given class SR, the credit value for that class decreases at a given rate (sendSlope), defined for each class. Instead, the credit value increases at a given rate (idleSlope) when the credit value is lower than zero, even if there are no frames to be transmitted, or if there are frames to be transmitted but the transmission of frames for that given class is blocked by other transmissions in progress. In other words, the traffic-shaping mechanism decides, on the basis of the current value of credit of a given class, whether there can occur or not a transmission of frames corresponding to that particular class.

The SRP protocol enables reservation of bands to flows belonging to the queues 10 of classes SR A and B, in the path from one Ethernet port to another, for example from a source node to a destination node, including bridges, across which the flows pass along their path, so as to guarantee an end-to-end latency within a guaranteed maximum value (the standard defines 2 ms for class A, 50 ms for class B, on seven hops).

In particular, the SRP protocol for each flow SR calculates the band necessary for the frames of that flow to be transmitted within their deadline, checks whether there is sufficient band, and propagates to all the nodes between the source and the destination the information on the band required. The CBS protocol, unlike the SRP protocol, exploits this information for calculating and assigning to each queue SR the correct value of idleSlope and sendSlope.

Bridges are network devices located at layer 2 of the ISO/OSI model, which are used as interconnection devices between the nodes; in particular, in the IEEE 802.1Q standard, and also in the TSN standard, the term "bridge" is used to mean switch.

In general, to support the traffic scheduled-traffic class ST, with highest priority, the IEEE 802.1Qbv amendment (IEEE 802.1Qbv-2015, "IEEE Standard for Local and Metropolitan Area Networks—Bridges and Bridged Networks—Amendment 25: Enhancements for Scheduled Traffic", December 2015) defines a mechanism, referred to as "time-aware shaper", for blocking the transmissions of the flows with a priority lower than that of the traffic class ST (i.e., the flows BE and SR A and SR B), guaranteeing the transmission of the frames ST according to a predefined time schedule.

In fact, to each flow of the traffic class ST there is generally dedicated a time window, referred to as "protected window PW". During the window PW, transmission of the frames belonging to the queues 10 of other classes SR A and/or B and BE is inhibited. The time-aware shaping mechanism is implemented via components 14, referred to as "gates", which are located at output from each queue 10, the role of which is to block/unblock transmission of frames according to a periodic schedule. With reference to FIG. 1, the protocol defined in the IEEE 802.1Qbv standard (Annex Q) envisages that, when there is traffic to be transmitted in the queue 10 for the traffic class ST, the gate 14 of the queue 10 with highest priority (i.e., the gate of the queue ST on the right) is open, and the gates 14 of all the other queues 10 are closed so as to create a time window (namely, the protected window) that will isolate the transmission of frames belonging to the traffic class ST.

Moreover, in order to prevent transmission of a frame with lower priority, for example belonging to classes SR A, SR B, or BE, from possibly interfering with transmission of a frame with higher priority, transmission of frames other than the frames with highest priority ST is inhibited in the case where this transmission may continue beyond the start of the protected window PW. The time that elapses from start of inhibition of transmission of frames with lower priority (in the case where the size of the frames may be such as to lead transmission of the frames to continue beyond the start of the protected window PW) to start of transmission of the protected frames with highest priority is referred to as "guard band GB". The guard band for a given queue can have a variable size, which depends upon the length of the frame of the aforesaid queue that is ready for being transmitted, or else a fixed size. The IEEE 802.1Qbv standard defines the concept and sizing of the guard band GB in the case where there are no preemption mechanisms. The IEEE 802.1Qbu standard defines the concept and the sizing of the guard band GB in the case where preemption mechanisms are adopted. When a guard band GB for a given queue is active, then the transmission of frames contained in that queue is inhibited.

Finally, in FIG. 1, a block PHY carries out transmission of the frames resulting from the strict-priority block 11 at output from the communication interface 1.

Figure 2:
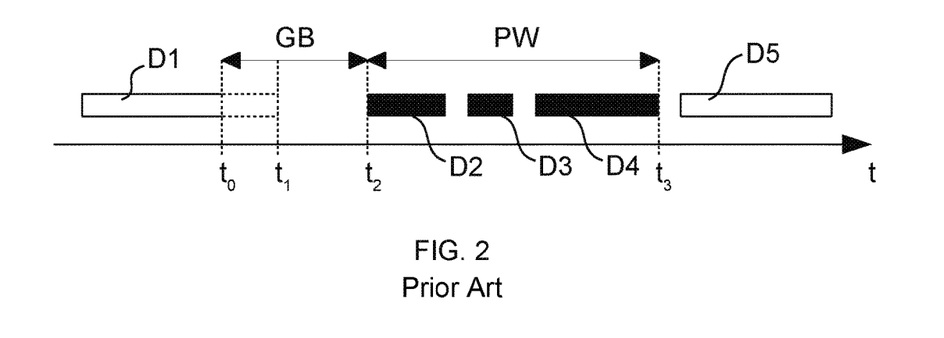
FIG. 2 represents the timing chart of a transmission of frames, during a protected window.

An example of transmission of frames D during a protected window PW and a guard band GB is illustrated in FIG. 2.

At an instant $t_0$, the guard band GB is active, inhibiting start of transmission of the frames D with lower priority; however, transmission of the frame D1 continues and terminates at an instant $t_1$. In other words, the gate 14 inhibits the passage of new frames D.

At an instant $t_2$, the guard band GB ends, and the time protected window PW starts; during this protected window PW the frames with highest priority ST, which is the figure are represented as frames designated as D2, D3, and D4 separated by an interframe gap, are transmitted. At an instant $t_3$, the protected window PW closes, and the transmission of frames with lower priority can resume, for example, transmission of the frame D5. Purely by way of example, the frame D5 may belong to a class SR_A, but may also belong to other classes.

In other words, when the guard band is active, transmission of the frame in progress is completed even though it belongs to a traffic class with lower priority than the traffic class ST, and start of transmission of further frames that do not belong to the traffic class ST is inhibited.

The types of traffic presented so far and defined by the IEEE 802.1Q and IEEE 802.1Qbv standards do not explicitly define transmission of high-priority real-time event-triggered traffic ET.

For instance, it has been noted that the traffic ET could be transmitted as scheduled traffic ST. However, it would be necessary to reserve portions of band to the traffic ET, with the possible consequence of reserving band for frames that might not then be present, for example in the case where there do not occur events that trigger transmission of frames belonging to the real-time event-triggered traffic class ET. In fact, by definition, real-time event-triggered frames ET are generated by events and hence at instants that are not predictable beforehand.

In this case, it has been noted that, by scheduling in a time-triggered way transmissions of a traffic ET, there would be created an overprovisioning of band for the traffic of frames ST, since, at the moment envisaged for transmission, the traffic ET might not even exist because the event that generates it has not occurred.

It has been noted that even managing the real-time event-triggered traffic ET as traffic class SR A would prove far from efficient or even impracticable since the traffic frames ET can be generated in considerable flows or bursts and have a stringent temporal constraint or deadline (and hence call for a latency that is as low as possible), and the action of the traffic shaper CBS 12, aimed at limiting or preventing traffic bursts, appears incompatible with the aim of reducing latency of real-time traffic frames ET.

In general, the traffic ET may also be managed via queues 10 belonging to the frames of class BE. However, this does not make it possible to provide for the real-time traffic ET a service that is adequate for meeting the time constraints that this type of traffic ET requires.

In fact, also on the hypothesis of being able to have a traffic ET of a sporadic type, i.e., a traffic ET in which there is a minimum time between arrival of a frame ET and arrival of a subsequent frame ET of one and the same flow, it is not possible for the best-effort traffic BE, according to the known standard, to provide guarantees in terms of latency.

Consequently, it is desired to provide a management of the traffic ET that that will make it possible to calculate analytically the upper limit or bound on the delays for the real-time traffic ET in the case where there is a model of arrival of a sporadic type.

In general, as described previously, the IEEE 802.1Q-2014 standard defines various mechanisms for transmission of real-time traffic. For instance, the strict-priority scheduler (SPS) mechanism attributes different priorities to the FIFO queues present in the Ethernet ports (up to eight queues for each port) and envisages transmission of the frames on the basis of the priority of the queue in which they are located.

Consequently, first the frames that are in the queue with highest priority are transmitted and then, as the queues with highest priority have been served, the frames of the queues with ever progressively priority are transmitted.

The SPS mechanism enables transmission of real-time event-triggered frames, without, however, having the possibility of guaranteeing the delays thereof. In fact, with the SPS mechanism it is possible to guarantee an upper bound on the delays of the frames transmitted belonging to the queue with highest priority, and not also of the frames with lower priority.

The traffic shaper CBS 12, for the reasons already explained previously, given that it is aimed at limiting or preventing the traffic bursts, appears incompatible with the aim of reducing the latency of the real-time traffic frames ET.

Another possible option for the transmission of the traffic ET may be represented by the burst-limiting shaper, described in the following documents:

Franz-Josef Götz, "Alternative Shaper for Scheduled Traffic in Time Sensitive Networks", IEEE 802.1 TSN TG Meeting—Vancouver, 15 Jan. 2013, available online at http://www.ieee802.org/1/files/public/docs2013/new-goetz-TSN-4-Industrial-Networks-20130115-v1.pdf, and D. Thiele, R. Ernst, "Formal Worst-Case Timing Analysis of Ethernet TSN's Burst-Limiting Shaper", Design, Automation and Test in Europe Conference and Exhibition (DATE), 2016.

This shaper, which is currently studied by TSN and devised for the control-data-transmission frames CDT, is associated to one or more queues with a priority higher than that of the queues of the traffic classes SR A or B.

Associated to each queue is a credit value that starts from zero and, whenever a frame CDT from a queue of the shaper is transmitted, the credits increase at a certain rate; if, instead, no frame CDT from the queue is transmitted, the credits decrease at another certain rate. The frames CDT can be transmitted only when the credits are below a certain threshold. If this threshold is reached, the transmissions of the frames CDT are blocked, and the credits decrease until they reach a lower threshold.

If the BLS mechanism were to be used for transmitting real-time event-triggered traffic, transmission of bursts of traffic ET would be limited in time, i.e., until the credits reach the blocking threshold. In addition to this, the frames CDT can undergo long delays on account of the limitation on the transmission of bursts. Such delays might not be compatible with the dynamics of real-time event-triggered traffic ET. Moreover, the BLS mechanism, as described in the documents cited above, does not operate in conjunction with the scheduled traffic ST defined by the IEEE 802.1Qbv standard, but replaces it.

Another mechanism of management of data traffic may be represented by cyclic queuing and forwarding (CQF), known also by the name of peristaltic shaper, described, for example, in the document S. Thangamuthu, N. Concer, P. J. L. Cuijpers, J. J. Lukkien, "Analysis of Ethernet-Switch Traffic Shapers for In-Vehicle Networking Applications", Design, Automation and Test in Europe Conference and Exhibition (DATE), 2015.

Also this mechanism describes a shaper for the transmission of traffic CDT of the type described previously, standardisation of which is in progress (IEEE P802.1Qch standard, see the IEEE document P802.1Qch-draft 2.2, "Draft Standard for Local and Metropolitan Area Networks—Bridges and Bridged Networks—Amendment: Cyclic Queuing and Forwarding", February 2017).

The CQF mechanism envisages division of the time into portions, timeslices, of fixed duration (d) that follow one another cyclically. Each timeslice has an index i, and a frame CDT that arrives in a timeslice i will be transmitted in the next timeslice i+1. This transmission mechanism enables regulation of the upper bound on the delays by modifying the duration of the timeslice.

In fact, the "draft" of the standard specifies how to configure the duration of the timeslice so as to be able to transmit all the traffic CDT received in a timeslice i plus the possible interference of a frame not belonging to the class CDT of maximum dimensions.

The IEEE 802.1Qch protocol can substitute the CBS mechanism (the modalities of transmission of frames of class SR A and B are in fact specified) rendering transmission of the frames independent of the other traffic classes. In addition, in order to guarantee the determinism of the transmissions, the timeslices are sized on the basis of the periodic flows that are recorded. For this reason, it is not suitable for transmission of real-time event-triggered traffic ET, since the transmission of bursts of frames ET might not fall within just one timeslice, and this would once again lead to an increase of the delays, which would also have repercussions on future transmissions.

SUMMARY OF THE INVENTION

An object of one or more embodiments is to overcome the drawbacks described above and to provide a communication method and a communication interface based upon the standard defined by the Time-Sensitive Networking Working Group of IEEE for networks based upon Ethernet switches that comply with the IEEE 802.1Q, 802.1Qbv, 802.1Qbu communication standards, which, as compared to the existing solutions described previously, will provide a support from a class of frames of a high-priority event-triggered type, transmission of which should occur in the shortest time possible.

An object of one or more embodiments may be that of introducing a real-time event-triggered class ET, enabling a priority transmission thereof, maintaining moreover a support for the scheduled traffic of class ST and enabling guaranteed maximum latencies for the classes SR, on a maximum of seven hops between a source node and a destination node.

According to one or more embodiments, the above object can be achieved thanks to a method for managing traffic in a network based upon Ethernet switches, which are, in particular, compliant with the IEEE 802.1Q, 802.1Qbv, 802.1Qbu, and TSN communication standards, comprising:

receiving frames belonging to a plurality of traffic classes, classified on the basis of respective priorities, the plurality of traffic classes comprising an event-triggered traffic class that includes high-priority real-time event-triggered received frames;

dividing into a plurality of queues the frames received belonging to the plurality of traffic classes, each queue being dedicated to a respective traffic class in the plurality of traffic classes;

scheduling transmission of the frames contained in the aforesaid queues in the plurality of queues on the basis of the respective priorities of the traffic classes in the plurality of traffic classes; and if frames are present belonging to a traffic class in the plurality of traffic classes that has a higher priority than frames belonging to the event-triggered traffic class and when at least one protected time window is active, transmitting one or more frames that belong to the traffic class with higher priority and blocking transmission of the frames belonging to the remaining traffic classes in the plurality of traffic classes;

if no frames are present belonging to a traffic class in the plurality of traffic classes that has a higher priority than frames belonging to the event-triggered traffic class, or else the at least one protected time window is inactive, carrying out operations of transmission of a frame belonging to one of the remaining traffic classes, amongst which:

transmitting a frame contained in the queue dedicated to the event-triggered traffic class; and transmitting a frame belonging to one of the remaining traffic classes in the plurality of traffic classes that have frames with a priority lower than that of the frames belonging to the event-triggered traffic class, on the basis of said scheduling if said queue dedicated to the event-triggered traffic class is empty.

One or more embodiments may also regard a communication interface for a network based upon Ethernet switches that comply with the IEEE 802.1Q standard, or IEEE 802.1Qbv standard, or IEEE 802.1Qbu standard, or upon proprietary switches inspired thereby, as well as a corresponding computer program product.

Moreover, the patent application may regard a vehicle comprising a communication network based upon Ethernet switches that comply with the IEEE 802.1Q standard, or IEEE 802.1Qbv standard, or IEEE 802.1Qbu standard, or upon proprietary switches inspired thereby, in which at least one communication interface for such a network comprises characteristics according to one or more embodiments, as well as an electronic control unit that executes the steps of the method according to one or more embodiments.

The claims form an integral part of the technical presentation of embodiments as provided herein.

Other objects, features and advantages of the present invention will be readily appreciated as the same becomes better understood after reading the subsequent description taken in connection with the accompanying drawings.

BRIEF DESCRIPTION OF THE DRAWINGS

One or more embodiments will now be described, purely by way of example, with reference to the annexed drawings, wherein.

DETAILED DESCRIPTION OF THE INVENTION

In the ensuing description, one or more specific details are illustrated, with the aim of providing an in-depth understanding of the examples of the embodiments of the present description. The embodiments may be obtained without one or more of the specific details or with other methods, components, materials, etc. In other cases, known operations, materials, or structures are not illustrated or described in detail so that certain aspects of the embodiments will not be obscured.

Reference to "an embodiment" or "one embodiment" in the framework of the present description is intended to indicate that a particular configuration, structure, or characteristic described with reference to the embodiment is comprised in at least one embodiment. Hence, phrases such as "in an embodiment", "in one embodiment", or the like, that may be present in one or more points of the present description do not necessarily refer precisely to one and the same embodiment. Moreover, particular conformations, structures, or characteristics may be combined in any adequate way in one or more embodiments.

The references used herein are provided merely for convenience and hence do not define the sphere of protection or the scope of the embodiments.

One or more embodiments introduce a new traffic class, comprising real-time event-triggered frames ET. This class is constituted by high-priority real-time traffic (including bursts, which may be frequent) generated by events not correlated to mere lapse of time, that is to be delivered with latencies that are as low as possible.

The real-time class ET can be fitted into the context of the classes already defined and existing in the TSN standard (for example, ST, SR A and B, and BE) and hence can present the advantage of compatibility and coexistence therewith, for example to obtain the desired priority and limit impact on the performance of the already existing classes with lower priority.

One or more embodiments can operate at the Ethernet MAC (Media Access Control) level and, in particular, can use a forwarding process defined by the IEEE 802.1Q standard, with the introduction of appropriate modifications.

In general, in FIG. 3 parts or elements that are similar to parts or elements already discussed with reference to FIG. 1 or FIG. 2 are designated by the same references, so that any repetition of the corresponding description is no longer necessary.

Figure 3:
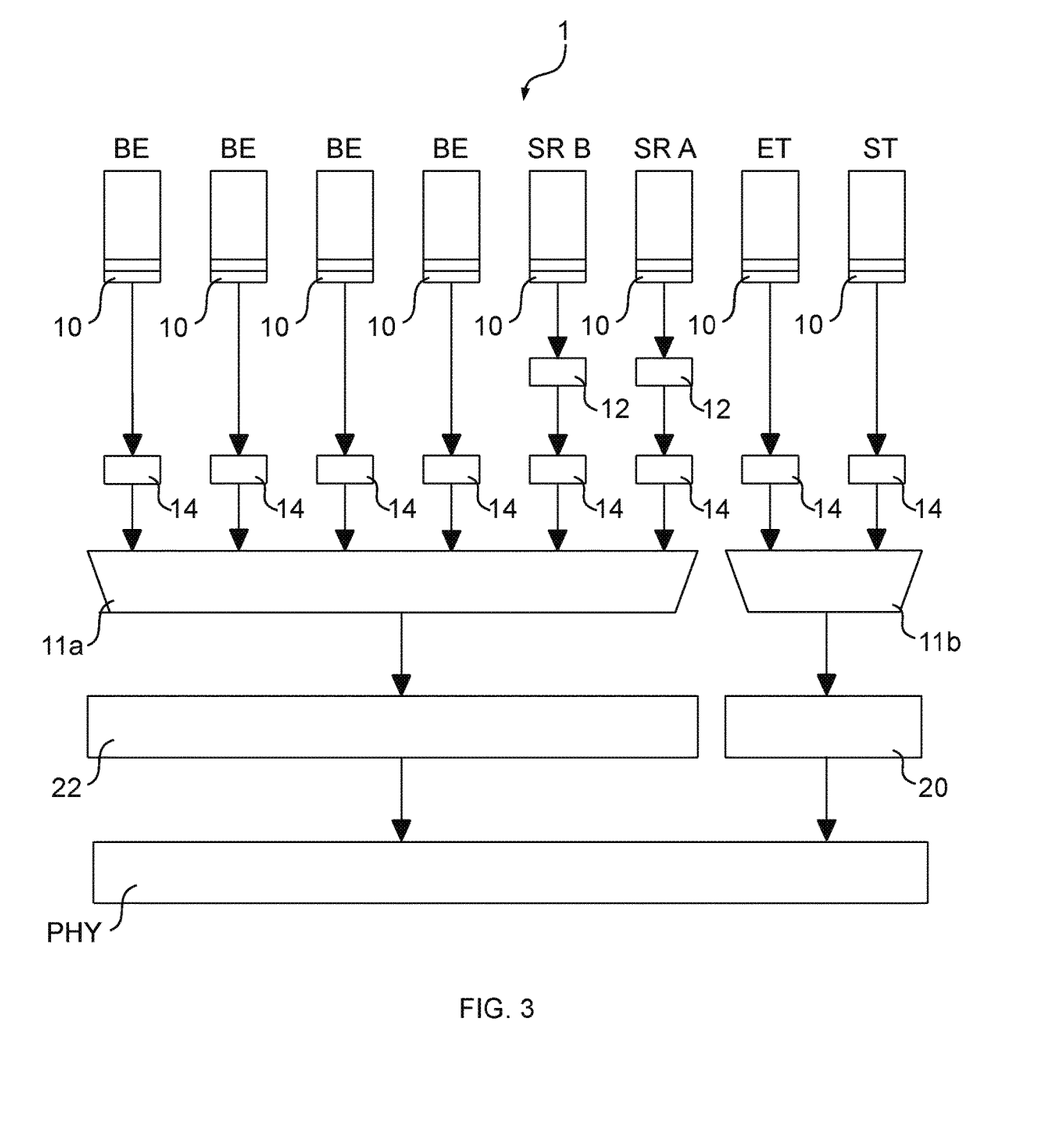
FIG. 3 is a block diagram provided by way of example of a communication interface of a network based upon Ethernet switches that comply with the IEEE 802.1Q, IEEE 802.1Qbv, and IEEE 802.1Qbu standard according to one or more embodiments.

FIG. 3 illustrates a communication interface for an Ethernet network 1 based upon the IEEE 802.1Qbv standard according to one or more embodiments. The interface 1 can receive frames belonging to respective traffic classes, schedule the frames received on the basis of the priority of the traffic classes, and use an Ethernet physical layer PHY for transmitting the aforesaid frames, this physical layer not forming part of the communication interface 1. It will be appreciated that in the present description the terms "transmission" or "enabling for transmission" can be used as synonyms.

In general, the communication interface 1 may comprise both software components and hardware components that can be implemented, for example, via FPGAs or ASICs and are described via languages such as Verilog or VHDL.

The communication interface 1 may comprise a number of queues dedicated to the traffic classes. In particular, it is possible to introduce a queue 10 of a traffic class ET, which has a priority lower than just the queue ST and is dedicated to transmission of real-time event-triggered traffic, i.e., traffic generated by an unforeseeable event, possibly sporadic and with high temporal priority. The traffic class ET may comprise frames to which there may be associated an upper limit of delay accepted prior to transmission and which cannot be managed on the basis of a schedule on account of their event-triggered nature. For instance, these data may comprise information on the safety of a user who is driving a vehicle and may be generated when a hazard is detected.

One or more embodiments may envisage a preferential management of the traffic of class ET in order to reduce the latency thereof. For instance, the traffic of class ET, like the traffic of class ST, can rely on a preemption function, defined by the IEEE 802.3br and IEEE 802.1Qbu standards, which can enable interruption of transmission of a frame of a class with lower priority in favour of transmission of a frame of a class with higher priority, respectively, the classes ET or ST. It should be noted that the traffic ST cannot perform a pre-emption on the traffic ET. The following documents describe the standards cited:

IEEE 802.3br-2016, "IEEE Standard for Ethernet—Amendment 5: Specification and Management Parameters for Interspersing Express Traffic", October 2016; and IEEE 802.1Qbu-2016, "IEEE Standard for Local and Metropolitan-Area Networks—Bridges and Bridged Networks—Amendment 26: Frame Preemption", August 2016.

Consequently, the queues 10 belonging to the classes ET and ST can be coupled to an eMAC (express Media Access Control) block designated by 20, where eMAC is a MAC layer defined in the 802.3br standard that enables transmission of high-priority frames (also referred to as "express frames") via preemption of transmission of the frames with lower priority (also referred to as "preemptable frames").

In various embodiments, the preemptable frames (i.e., the frames that, on the basis of the IEEE 802.3br-2016 standard, can undergo preemption) are the ones included in the queues 10 belonging to the classes SR A, SR B, and BE. Consequently, the queues 10 comprising frames belonging to these traffic classes are coupled to a pMAC (preemptable Media Access Control) block, designated by the reference number 22, where pMAC is a MAC layer envisaged by the IEEE 802.3br-2016 standard for management of preemptable traffic.

In FIG. 3, the queues 10 belonging to the traffic classes BE, SR A, and SR B are represented coupled to a single strict-priority block, designated by 11a, of the type described previously. The block 11a enables transmission of the queue 10 with highest priority (in FIG. 3 the queue 10 with highest priority is the one illustrated on the right, and the priority decreases from right to left) that is not empty, and the frame that is located at the head of that queue 10 is transmitted. The strict-priority block 11a consequently receives at input the frames included in the queues 10, which belong to the preemptable traffic classes, for example SR A, SR B, and BE, and transmits at output the frames to the pMAC block 22. In a similar way, the queues 10 belonging to the traffic classes ET and ST are connected to a strict-priority block designated by 11b, of the type described previously, the output of which is connected to the eMAC block 20.

In general, as envisaged by the 802.3br standard, the two MAC layers, represented by the eMAC block 20 and the pMAC block 22, can coexist thanks to a MAC Merge sublayer, which represents an optional sublayer that enables the express (i.e., priority) traffic, corresponding to the classes ET and ST, to be interspersed with preemptable traffic, corresponding to the classes BE and SR A and B, by associating an eMAC and a pMAC to a single PLS (Physical Signalling Sublayer) service.

In various embodiments, a block PHY, described previously, represents the Ethernet standard physical layer that carries out transmission of the frames received from the communication interface for a network based upon Ethernet switches 1. The physical block PHY, which does not form part of the communication interface 1, can receive the frames at output from the eMAC block 20 and pMAC block 22, so as to enable preemption of the preemptable frames and reduce a possible latency in the transmission of the traffic belonging to the class ET. Optionally, the physical block PHY can receive the frames via the MAC Merge sublayer.

The eMAC block 20 is consequently connected to the strict-priority block 11b that implements the strict-priority mechanism discussed previously, for the queues 10 with higher priority, i.e., the queues 10 belonging to the traffic classes ST and ET. Likewise, the pMAC block 22 is connected to a strict-priority block 11a, for the preemptable queues 10 with lower priority, i.e., the queues 10 belonging to the traffic classes BE and SR A and B.

Also in the interface 1, according to one or more embodiments, set above the strict-priority blocks 11a, 11b (which are here represented as separate but in one or more embodiments may form a single block 11 based upon the strict-priority policy), between the blocks 11a, 11b themselves and each queue 10, are the gates 14. The gates 14 can be connected, for example directly, between the queues 10 belonging to the traffic classes BE, SR A, and SR B and the strict-priority block 11a and between the queues 10 belonging to the traffic classes ST and ET and the strict-priority block 11b.

The gates 14, in accordance with the IEEE 802.1Qbv standard, enable introduction of one or more protected windows PW, and also of respective guard bands GB, for transmission of traffic belonging to the class ST. In particular, upon opening of a protected window PW, all the gates 14 connected to the queues 10 belonging to classes other than the traffic class ST and hence with lower priority are closed, and the gate 14 connected to the queue 10 of the traffic class ST is opened. At the end of the protected window PW, the gate 14 of the queue 10 belonging to the traffic class ST is closed, and the other gates 14 are opened.

In one or more embodiments, it is possible for the event-triggered traffic class to be the one that comprises the frames with highest priority (for example, in the case where no frames of the traffic class ST are present). In this case, the queue 10 belonging to the frames of the traffic class ST may be absent, and/or the gates 14 may be kept always open in so far as there are not one or more protected windows PW that force closing thereof.

It will be appreciated that, in the present embodiment, the gates 14 of classes ST, ET, and BE are directly connected to the respective queues 10. Instead, traffic shapers or credit-based shapers CBS 12 can be set between the queues 10 belonging to the traffic classes SR A and B and the respective gates 14, and can apply a mechanism of traffic shaping based upon an increase/reduction of credits that enable management of transmission of the frames contained in the queues belonging to the classes SR A and B. It will be appreciated that, even though traffic-shaping mechanism is exemplified in the present embodiment, it is optional and is represented by traffic shapers 12 merely by way of non-limiting example.

In general, respective credit values may be associated to the queues 10 belonging to the traffic classes SR, for example SR A and SR B. Transmission of the frames contained in a particular queue 10 may hence be a function of the credit value associated to that queue. For instance, if the credit value of a queue 10 is greater than or equal to 0, that queue is enabled for transmission (for example, it can transmit frames if no frames with higher priority are being transmitted); otherwise, if the credit value of a queue 10 is lower than 0, transmission of new frames of that queue 10 is blocked (for example, if the credit value reaches the value zero during transmission of a frame, transmission is not interrupted, but is allowed to finish—provided that there is no further traffic-scheduling mechanism that can affect transmission, for example a preemption mechanism).

The credit values are variable, namely:

when transmission of the frames contained in the queue 10 associated to the particular credit value is blocked, for example because there occurs transmission of frames with a priority higher than that of the frames contained in the queue 10 or else the credit value is negative and the gate for that queue is open, this credit value increases at a certain rate, for example equal to idleSlope, as described more fully hereinafter; and when transmission of the frames contained in the queue 10 associated to the particular credit value is enabled, this credit value decreases at a certain rate, for example equal to sendSlope.

To sum up, the communication system proposed enables transmission of the following traffic classes, listed in decreasing order of priority:

scheduled traffic (ST), which is of a real-time type and has the highest priority, and is generated and transmitted according to a predefined schedule so as not to suffer from interference due to other traffic classes;

event-triggered traffic (ET), which is of a real-time type and has a high priority (second only to the traffic of class ST), frequently may comprise data bursts, is generated by events and is not correlated to the mere lapse of time, and can, however, require a transmission that presents a low latency (above all in the case of the traffic bursts of class ET);

stream-reservation traffic (SR), which is of a real-time periodic type and is divided into two classes, class A (higher priority) and class B (lower priority), and for which a maximum delay on seven hops is to be guaranteed; this traffic is in general managed following the specifications of the IEEE 802.1Q-2014 standard, with some modifications both as regards the modality of management of the transmission and as regards the formulas, for example calculation of the rates idleSlope and sendSlope as described previously, which are used for configuring the parameters of transmission of the frames and are purposely introduced for compensating the effect of introduction of the traffic ET; it should be noted that the stream-reservation classes may comprise other classes in addition to SR A and SR B. For instance, the firm TTTech has introduced the class C for Hermes switches; and best-effort traffic (BE), which is not real-time, has the lowest priority of all the classes presented, and is served without any guarantee either on delivery or on the maximum delay.

Consequently, in various embodiments, when a frame of traffic class ET arrives from an application layer, it is entered in the queue 10 dedicated to the traffic class ET. This queue 10 can be managed, for example, as a FIFO queue or via a scheduling algorithm based upon assignment of a static or dynamic priority (e.g., based upon a relative or absolute deadline).

Hence, the frames ET can await transmission within the queue 10 for a period of time referred to as "queuing delay", which can depend upon the policy of management of the queue 10 itself, as described previously. When the frame of class ET is at the head of the queue 10, it can be transmitted.

For instance, if the gate 14 connected to the queue belonging to the class ET is closed—i.e., in the case where a protected window PW is active—the frame ET awaits opening of the gate 14 to be transmitted. The protected window PW has a limit duration, which enables guarantee of a maximum latency prior to transmission of a frame.

If, instead, the gate 14 of the queue 10 of class ET is open, for instance the protected window is absent, the frames can be transmitted, and for example:

if there are no transmissions of frames of class SR or class BE in progress, the traffic of class ET is transmitted; and if a transmission of frames of one of the classes SR and BE is in progress, the traffic ET has the faculty of preempting them.

In other words, on the basis of the IEEE 802.3br standard, if the preemptable frames that belong to the classes with a priority lower than that of the class ET and are in the process of being transmitted have reached a minimum size, i.e., they overstep a pre-set lower threshold (for example, a value defined by the standard as 64 bytes), and the portion of the preemptable frames that remains to be transmitted has a total size greater than a pre-set total size (for example, a value defined by the standard as 124 bytes)—which can represent the largest segment of preemptable frames that can be transmitted without being interrupted—, then it is possible to start transmission of the traffic ET, after a further delay corresponding to transmission of a CRC (Cyclic Redundancy Check) frame-checking sequence, for example having a size of 4 bytes, plus an interval between consecutive transmissions of frames (IFS—InterFrame Space), i.e., the minimum time interval between the end of one transmission and the start of the next, for example 12 bytes.

In the embodiments that optionally implement the preemption mechanism, the delay that a frame ET can undergo on one hop and in the absence of traffic ST can be equal to, at the most, or less than an upper bound of latency. This upper bound is a sum of the non-preemptable maximum size of a pre-set frame in accordance with the standard and the interval between consecutive transmissions of frames (interframe space IFS), which is also defined by the standard.

Hence, in various embodiments, both the queue 10 belonging to the class ST and the queue 10 belonging to the class ET can optionally be connected to the eMAC block 20 in order to reduce further the latencies that the traffic ET can undergo.

It will be appreciated that the preemption mechanism defined by the 802.3br standard is not destructive. In fact, a preemptable transmission (in the case of the embodiment set forth here, a transmission belonging to the classes SR A, SR B or BE), interrupted on account of transmission of an express frames, can resume from the point where it underwent preemption when transmission of the express frame is through, with a delay equal, for example, to the time required for transmission of the express frame plus the time corresponding to the IFS. It will be appreciated that transmission of the frame that has undergone preemption can resume if the following conditions arise:

transmission of an express frame is through; and/or there is no frame with higher priority of class ET awaiting transmission; and/or the protected window PW is inactive; and/or the guard band GB is inactive, or else the guard band GB is active and the portion of frame that has undergone preemption can be transmitted prior to start of the protected time window PW.

In this way, as described previously, the delay (at the MAC level) on a single hop that the frame of class ET with highest priority in the queue 10 can undergo may depend upon:

the duration of the protected windows PW dedicated to transmission of traffic of class ST, with the highest priority; and/or the portion of frame, with a priority lower than that of class ET, that can be transmitted without undergoing preemption (i.e., the time necessary for transmitting the maximum non-preemptable portion of a frame plus the time corresponding to the IFS as described previously).

Moreover, the latency that a frame of class ET can undergo may also depend upon its own waiting time in the queue 10 of class ET, which may, in turn, depend upon its arrival in the queue, for example, a queue of a FIFO type, or else upon a different policy of management of the queue 10.

In various embodiments, the introduction of the new traffic class ET can have an impact on transmission and on the configuration of the parameters of transmission of the frames of the classes with lower priority, i.e., SR A, SR B, and BE. For this reason, it is possible to introduce new modalities of traffic management with lower priority. Purely by way of example, in the case of the traffic shaper CBS 12, the credit-accumulation parameters for the classes SR A and B, which determine the rate at which the credit for these classes SR is recharged, can be modified.

For instance, as regards calculation of the rate of recharging (idleSlope) of the credits for the classes SR, in the presence of scheduled traffic ST, it is possible apply Eq. (1) in accordance with the IEEE 802.1Qbv standard:

$$idleSlope = operIdleSlope(N) \times \frac{OperCycleTime}{GateOpenTime} \quad (1)$$

where operIdleSlope(N) is a value of idleSlope for a class N (with N equal to A or B) calculated according to the stream-reservation protocol (SRP) referred to above, OperCycleTime is a cycle can be modified of the state machine that controls opening/closing of the gates 14, and GateOpenTime is a total time within an OperCycleTime during which the gate 14 for the class N is open. This equation can increase the rate (i.e., the slope) with which the credit value of the credit-based shaper CBS 12 is recharged, taking into account the interference due to transmission of traffic of class ST.

With the introduction of the real-time event-triggered traffic class ET and in the case where an embodiment is considered in which the traffic shapers 12 are present, the calculation of idleSlope can be modified so that it will increase faster, in such a way as to compensate for the band used by the traffic ET. A possible innovative solution envisages definition of a new parameter ETBW (ET bandwidth), which corresponds to the widest portion of band that can be used for transmission of a burst of traffic ET, namely:

$$ETBW = \frac{MexETBand}{portTransmitRate}$$

where MaxETBand is an upper limit of band that can be occupied by the real-time event-triggered traffic (expressed in bits per second) that may present within an OperCycleTime, whereas portTransmitRate is a data rate of the interface. Consequently, the new value of idleSlope can be calculated as represented Eq. (2) below:

$$idleSlope = \frac{operIdleSlope(N) \times OperCycleTime}{[GateOpenTime - (ETBW \times OperCycleTime)]} \quad (2)$$

In this way, the credit for the classes SR recharges faster, since it takes into account also the band occupied by the class ET.

In other words, according to the present solution, the rate of the credit value may also be a function of the periods of time corresponding to transmission of the frames of the traffic class ET or the traffic class ST.

It will be appreciated that the above equation takes into account the worst-case scenario; i.e., the calculation is made as a function of the limit bandwidth that may be required by the traffic ET. However, it is possible to take into account a mean value of bandwidth or else a statistically most likely value of bandwidth for the traffic ET. These are configuration parameters to be adapted to the characteristics of the flows present in the network.

As already anticipated, in various embodiments, the frames of the class ET can be transmitted both in FIFO order and on the basis of static or dynamic internal priorities (linked, for example, to the relative or absolute deadline, to the shortest slack time, etc.). In the case of FIFO transmission, the FIFO queue 10 that is assigned to the traffic ET can be used directly. Conversely, in order to support different types of priority, it is possible to replace the FIFO queue 10 of traffic ET with a priority queue implemented at a hardware level, or else envisage priority queues implemented at a software level.

Figure 4:
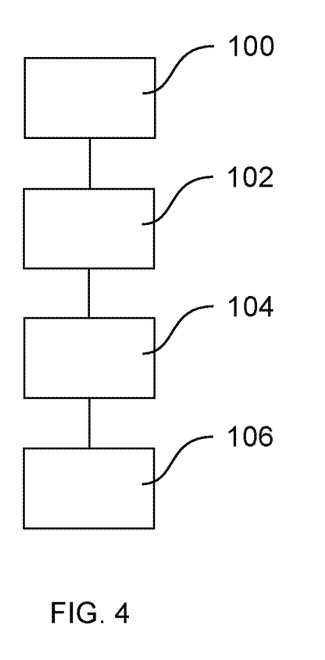
FIGS. 4 and 5 illustrate flowcharts provided by way of example of one or more embodiments.

In general, one or more embodiments may follow the method illustrated in FIG. 4. The method may comprise the following steps:

step 100: receiving frames, belonging to the traffic classes ST, SR A, SR B, BE, and to the traffic class introduced defined as ET, which contains high-priority real-time event-triggered received frames, where the traffic classes are classified on the basis of their respective priorities;

step 102: dividing the frames received into the queues 10, dedicated to the respective traffic classes;

step 104: scheduling the frames received awaiting transmission, for example, inside the queue, for example if the queue is of a FIFO type, and/or outside the queue, for example according to a strict-priority mechanism; and step 106: transmitting the frames on the basis of the above schedule.

Figure 5:
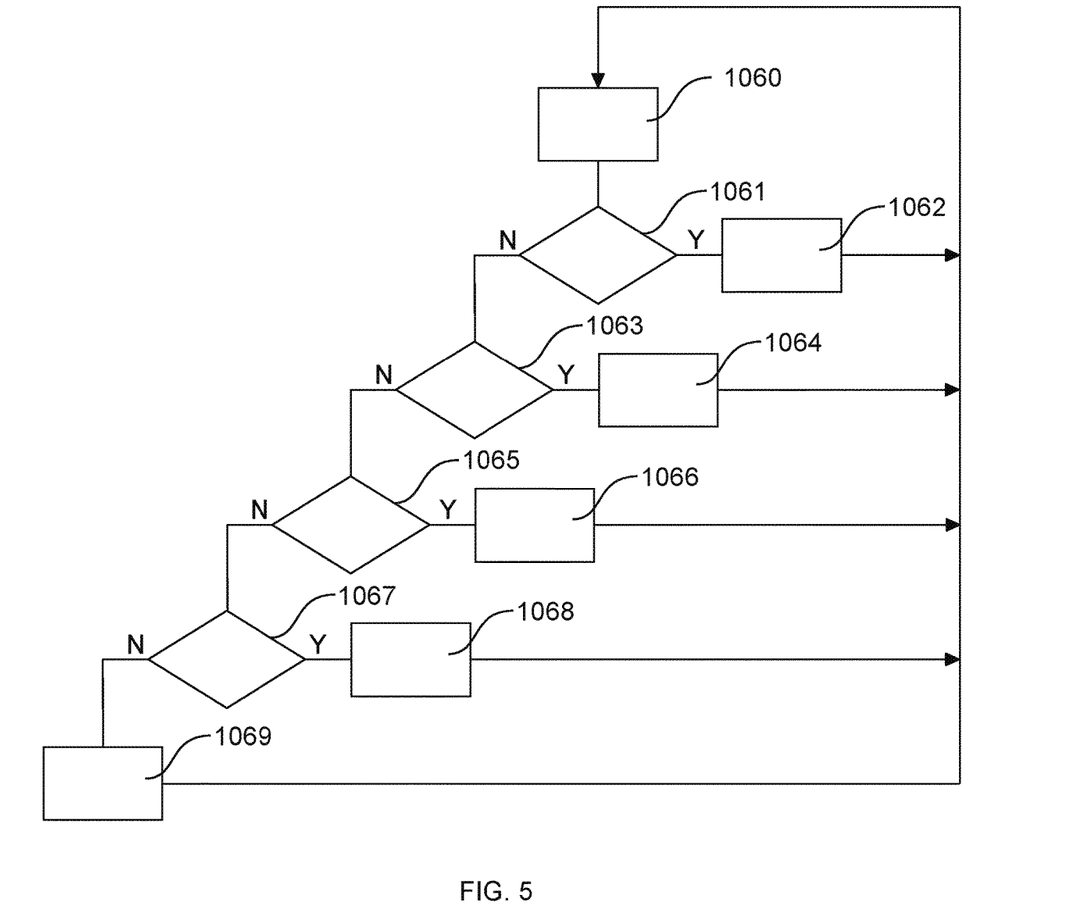

In particular, the aforesaid scheduling step 104 and transmission step 106 transmitting may comprise, in one or more embodiments, as illustrated purely by way of example in FIG. 5, the following steps:

step 1060: scheduling transmission of the frames contained in the queues, on the basis of the static or dynamic policy of priority of the queue 10 itself (for example, the queues 10 may comprise FIFO queues);

step 1061: checking whether a protected window PW is active;

step 1062: if the protected window is active (output Y from step 1061), transmitting one or more frames belonging to class ST, with highest priority, preventing transmission of the frames belonging to the classes with lower priority, and returning to step 1060;

step 1063: if the protected window is absent (output N from step 1061), checking whether the queue 10 dedicated to the event-triggered traffic ET contains frames awaiting transmission and the guard band GB for the queue ET is inactive;

step 1064: if the queue 10 contains frames of an event-triggered type and the guard band GB for the queue ET is inactive (output Y from step 1063), transmitting a frame of an event-triggered type contained in the respective queue 10, and returning to step 1060;

step 1065: if the queue 10 does not contain frames of an event-triggered type (output N from step 1063), checking whether the credit for the traffic class SR A is higher than or equal to zero and the guard band GB for the queue SR A is not active;

step 1066: if the credit for the traffic class SR A is higher than or equal to zero and the guard band GB for the queue SR A is not active (output Y from step 1065), transmitting a frame SR A contained in the respective queue 10 (it will be appreciated that, if the credit is greater than zero at the start of transmission and then becomes negative, but transmission of the frames is not yet through, the credit continues to drop until the transmission is through), and returning to step 1060;

step 1067: if the credit for the traffic class SR A is lower than zero (output N from step 1065), checking whether the credit for the traffic class SR B is higher than or equal to zero and the guard band GB for the queue SR B is not active;

step 1068: if the credit for the traffic class SR B is higher than or equal to zero and the guard band GB for the queue SR B is not active (output Y from step 1065), transmitting a frame of class SR B contained in the respective queue 10 (it will be appreciated that, if the credit is greater than zero at the start of transmission and then becomes negative, but transmission of the frames is not yet through, the credit continues to decrease until transmission is through), and returning to step 1060; and step 1069: if the credit for the traffic class SR B is lower than zero and the guard band for one or more queues BE is not active (output N from step 1067), transmitting a frame of class BE contained in the respective one or more queues 10, and returning to step 1060.

The guard band GB may be sized either statically—for example, it may be the same for all the traffic classes—or dynamically—for example, it is active in the case where transmission of the frames at the head of the queue of a traffic class interferes with start of a protected window PW. In this latter case, if the guard band is active, transmission of that particular frame is blocked, and it is possible, instead, to transmit a frame in a queue with lower priority if it does not interfere with start of the protected window PW.

Consequently, one or more embodiments may present the following characteristics:

the traffic of class ST can maintain its temporal isolation, and its transmission is not affected either by introduction of the traffic ET or by the remaining traffic classes with lower priority;

the traffic ET can only be affected by the interference of the traffic with higher priority, for example the scheduled traffic ST;

the traffic bursts ET can be managed without traffic shaping (via the traffic shaper 12), and hence the latencies can be reduced;

if all the consecutive frames ET of a flow arrive with a known minimum inter-arrival time interval, it is possible to calculate a maximum latency thereof;

for compensating the effect on the classes SR due to introduction of the class ET with higher priority, compensation mechanisms are implemented, for example, allowing the classes SR to accumulate the credits of the traffic-shaping mechanism faster than what is specified in the standard in order to compensate for the band used by the traffic ET; and the traffic of class BE is penalised by introduction of the traffic of class ET, which can subtract band from the traffic of class BE.

One or more embodiments may present the following advantages:

there is no limitation as regards transmission of traffic ET except the one deriving from the traffic ST, and it is the other traffic classes with lower priority that are configured taking into account the traffic ET;

a queue for transmission of the traffic ET is added, which operates in conjunction with the mechanism defined by the IEEE 802.1Qbv standard for transmission of scheduled traffic;

management of the requirements of event-triggered and real-time burst applications, which call for minimum delivery latencies, is enabled;

conversely, the use of other solutions, such as the shaper BLS, enables transmission of both event-triggered control traffic and periodic control traffic; however, it does not enable transmission of either scheduled or real-time event-triggered traffic with priority over the other types of traffic; in addition, since it is a shaper, the traffic bursts in the BLS are limited in time;

finally, another advantage of one or more embodiments is that both the number of latency peaks and the value of the latency peaks themselves is reduced as compared to the case where the real-time traffic ET is managed by inserting it in the queue BE with highest priority.

Without prejudice to the underlying principles, the details and the embodiments may vary, even appreciably, with respect to what has been described herein purely to way of example, without thereby departing from the sphere of protection of the present invention, which is defined by the annexed claims. Thus, the invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A method for managing traffic in a network based upon Ethernet switches, which are, in particular, compliant with the Institute of Electrical and Electronic Engineers (IEEE) 802.1Q and Time-Sensitive Networking (TSN) communication standards, comprising:
   receiving frames belonging to a plurality of traffic classes, classified on the basis of respective priorities, the plurality of traffic classes comprising an event-triggered traffic class, which includes priority real-time event-triggered received frames, which are also high priority and real-time frames;
   dividing the frames received belonging to the plurality of traffic classes into a plurality of queues, each queue being dedicated to a respective traffic class in the plurality of traffic classes, and divides in queues of a FIFO (First In First Out) type, or else enable transmission of the frames on the basis of internal priorities of the plurality of queues, whether static or dynamic;
   scheduling transmission of said frames contained in said queues in the plurality of queues on the basis of the respective priorities of the traffic classes in the plurality of traffic classes; and determining whether a protected window is active;
   said scheduling transmission of said frames including transmitting said received frames under the following conditions:
      when frames are present belonging to a traffic class in the plurality of traffic classes that has a higher priority than the frames belonging to the event-triggered traffic class and when at least one protected time window is active, transmitting one or more frames that belong to the traffic class with higher priority, and blocking transmission of the frames that belong to the remaining traffic classes in the plurality of traffic classes;
      when no frames are present belonging to a traffic class in the plurality of traffic classes that has a higher priority than frames belonging to the event-triggered traffic class, or else the at least one protected time window is inactive, carrying out operations of transmission of a frame belonging to one of the remaining traffic classes, amongst which:
         transmitting a frame contained in the queue dedicated to the event-triggered traffic class; and
         transmitting a frame belonging to one of the remaining traffic classes in the plurality of traffic classes that have frames with lower priority than the frames belonging to the event-triggered traffic class, on the basis of said scheduling, when said queue dedicated to the event-triggered traffic class is empty.

2. The method as set forth in claim 1, said step of scheduling transmission of said frames including verifying when a guard band is active and when a frame contained in the queue dedicated to the event-triggered traffic class has a size greater than a given threshold, which is calculated as a function of said guard band, and in the affirmative transmitting a frame belonging to one of the remaining traffic classes in the plurality of traffic classes that has a size smaller than or equal to said given threshold.

3. The method as set forth in claim 2, further including the steps of using a preemption mechanism whereby, when the frames contained in the further queue require transmission, the at least one protected time window is absent, and a transmission of a frame belonging to a traffic class with a priority lower than that of the event-triggered traffic class is in progress, in the case where the transmission has exceeded a pre-set lower threshold, preferably lower than or equal to 64 bytes, and a portion of frames with lower priority that remains to be transmitted has a total size greater than a pre-set upper-limit size, preferably greater than or equal to 124 bytes:
   transmission of said frame belonging to a traffic class with lower priority is blocked;
   transmission of said frame belonging to the event-triggered traffic class is enabled; and
   when transmission of said frame contained in the further queue is through, transmission of said frame belonging to a traffic class with lower priority is resumed.

4. The method as set forth in claim 1, further including the step of using a traffic-shaping mechanism whereby transmission of the frames that belong to stream-reservation traffic classes in the plurality of traffic classes is decided on the basis of respective credits, each credit being calculated as a function of the priority of the respective stream-reservation traffic class and of an amount of time that has elapsed between a transmission of a frame belonging to the respective stream-reservation traffic class and a subsequent transmission of a further frame belonging to the respective stream-reservation traffic class,
   said stream-reservation traffic classes being classes with a priority lower than that of the traffic class with higher priority and than that of the event-triggered traffic class and having an upper limit of latency.

5. The method as set forth in claim 4, wherein the rate of said credits is a function of at least one pre-set value that is different for each of the stream-reservation traffic classes, and of at least one value of band occupied by transmission of the frames of the event-triggered traffic class and/or of the traffic class with highest priority.

6. The method as set forth in claim 5, wherein the at least one value of band occupied by the transmission of the frames of the event-triggered traffic class and/or of the traffic class with highest priority is one from among:
- an upper-limit value of band that can be occupied by the traffic class; or else
- a mean value of band occupied by the traffic class; or else
- a statistically most likely value of band occupied by the traffic class.

7. The method as set forth in claim 1, wherein:
the event-triggered traffic class has a priority lower only than that of the traffic class with highest priority; and/or
transmission of the frames belonging to the event-triggered traffic class has a pre-set upper limit of latency that it can undergo if a lower limit of inter-arrival time between consecutive frames belonging to the event-triggered traffic class is known.

8. A computer program product comprising instructions stored on a non-transitory computer-readable medium, wherein the instructions when executed by at least one processor are configured to execute the steps of the method of claim 1.

9. A communication interface for a network based upon Ethernet switches, which are, in particular, compliant with the Institute of Electrical and Electronic Engineers (IEEE) 802.1Q and Time-Sensitive Networking (TSN) communication standards, comprising:
- means for dividing in a plurality of queues that received frames, belonging to a plurality of traffic classes, classified on the basis of respective priorities, the plurality of traffic classes comprising an event-triggered traffic class, which includes event-triggered received frames, which are also high priority and real-time frames, each queue being dedicated to a respective traffic class in the plurality of traffic classes, and divides in queues of a FIFO (First In First Out) type, or else enable transmission of the frames on the basis of internal priorities of the plurality of queues, whether static or dynamic,
- traffic-management means for scheduling transmission of said frames contained in said queues in the plurality of queues on the basis of the respective priorities of the traffic classes in the plurality of traffic classes, and
- a transmitter that transmits said received frames under the following conditions:
if frames are present belonging to a traffic class in the plurality of traffic classes that has a higher priority than the frames belonging to the event-triggered traffic class and when at least one protected time window is active, transmitting the frames that belong to the traffic class with higher priority, and blocking transmission of the frames that belong to the remaining traffic classes in the plurality of traffic classes;
if no frames are present belonging to a traffic class in the plurality of traffic classes that has a higher priority than frames belonging to the event-triggered traffic class, or else the at least one protected time window is inactive, carrying out operations of transmission of a frame belonging to one of the remaining traffic classes, amongst which:
- transmitting a frame contained in the queue dedicated to the event-triggered traffic class; and
- transmitting a frame belonging to one of the remaining traffic classes in the plurality of traffic classes that have frames with lower priority than the frames belonging to the event-triggered traffic class, on the basis of said scheduling, if said queue dedicated to the event-triggered traffic class is empty.

10. A vehicle comprising a communication network based upon Ethernet switches, present in which is at least one communication interface for a network based upon Ethernet switches according to claim 9.

* * * * *

UNITED STATES PATENT AND TRADEMARK OFFICE
CERTIFICATE OF CORRECTION

PATENT NO. : 10,812,397 B2
APPLICATION NO. : 16/222677
DATED : October 20, 2020
INVENTOR(S) : Lucia Lo Bello et al.

It is certified that error appears in the above-identified patent and that said Letters Patent is hereby corrected as shown below:

In the Claims

Column 19, Line 28 (Claim 9) delete "802.10" and insert therefor --(802.1Q)--.

Signed and Sealed this
Nineteenth Day of October, 2021

Drew Hirshfeld
*Performing the Functions and Duties of the
Under Secretary of Commerce for Intellectual Property and
Director of the United States Patent and Trademark Office*